July 15, 1969  W. E. MEINKE  3,455,610

MACHINE TOOL HAVING GUIDE ASSEMBLY WITH ADJUSTABLE ROLLERS

Filed July 11, 1966  10 Sheets-Sheet 1

FIG.1

INVENTOR
WILBUR E. MEINKE

BY *Hoffmann and Youd*
ATTORNEYS

July 15, 1969          W. E. MEINKE          3,455,610

MACHINE TOOL HAVING GUIDE ASSEMBLY WITH ADJUSTABLE ROLLERS

Filed July 11, 1966          10 Sheets-Sheet 2

FIG. 2

INVENTOR
WILBUR E. MEINKE
BY Hoffmann and Yount
ATTORNEYS

July 15, 1969  W. E. MEINKE  3,455,610

MACHINE TOOL HAVING GUIDE ASSEMBLY WITH ADJUSTABLE ROLLERS

Filed July 11, 1966  10 Sheets-Sheet 3

FIG. 3

INVENTOR
WILBUR E. MEINKE
BY *Hoffmann and Yount*
ATTORNEYS

July 15, 1969　　　　W. E. MEINKE　　　　3,455,610
MACHINE TOOL HAVING GUIDE ASSEMBLY WITH ADJUSTABLE ROLLERS
Filed July 11, 1966　　　　　　　　　　　　　10 Sheets-Sheet 5

INVENTOR
WILBUR E. MEINKE
BY Hoffmann and Mount
ATTORNEYS

July 15, 1969  W. E. MEINKE  3,455,610
MACHINE TOOL HAVING GUIDE ASSEMBLY WITH ADJUSTABLE ROLLERS
Filed July 11, 1966  10 Sheets-Sheet 6

INVENTOR
WILBUR E. MEINKE

BY Hoffmann and Young
ATTORNEYS

INVENTOR
WILBUR E. MEINKE
BY Hoffmann and Yount
ATTORNEYS

July 15, 1969  W. E. MEINKE  3,455,610
MACHINE TOOL HAVING GUIDE ASSEMBLY WITH ADJUSTABLE ROLLERS
Filed July 11, 1966  10 Sheets-Sheet 10

Fig. 15

INVENTOR.
WILBUR E. MEINKE
BY *Watts, Hoffmann,
Fisher & Heinke*
ATTORNEYS.

3,455,610
MACHINE TOOL HAVING GUIDE ASSEMBLY WITH ADJUSTABLE ROLLERS
Wilbur E. Meinke, Fairview Park, Ohio, assignor to The New Britain Machine Company, New Britain, Conn., a corporation of Connecticut
Filed July 11, 1966, Ser. No. 564,122
Int. Cl. F16c 29/04, 32/00
U.S. Cl. 308—6                                                    10 Claims

ABSTRACT OF THE DISCLOSURE

In a machine tool including a support member and a movable member, a guide surface or surfaces on one of the members, guide assemblies including a plurality of rollers carried by the other of said members, and means for simultaneously and/or individually adjusting the rollers toward and away from the guide surface or surfaces.

---

The present invention relates to machine tools, and more particularly to machine tools having one or more movable machine tool members or elements, such as a table, saddle, etc. supported by a support member, such as a bed, column, saddle, etc. for movement in opposite directions relative thereto.

The accuracy of various machining operations performed by machine tools of the type referred to above is dependent upon the manner in which the movable member is supported on the supporting member, the ease by which the movable member can be moved relative to the supporting member and the accuracy of the movement of the movable member relative to the supporting member, especially during feeding movements. The accuracy of the movement and/or positioning of the movable member is largely dependent upon the frictional resistance encountered when the movable member is moved and the accuracy by which the movable member is guided as it is moved in opposite directions relative to the support member. While various support and guide arrangements have heretofore been employed to reduce the friction between the movable and supporting member of a machine tool and to improve the accuracy of the movements of the movable members, they have not been entirely satisfactory where extremely accurate machining operations are to be performed.

In a machine tool of the type described and having one or more tool spindles, accuracy of the machining operations also is dependent upon the length of the tool spindle or spindles, the manner in which the tool spindle or spindles are driven, and the positioning of the tool spindle or spindles relative to the supporting head. The amount of torsion or twisting movement of the tool spindle having a tool attached to one end and a rotatable drive connection spaced from the tool depends upon the length of the spindle between its tool supporting end and the drive connection, and such torsion should be minimized to enhance machining accuracy. It is further desirable to provide for individual adjustment of the tool spindle assemblies relative to the head, while maintaining the spindle drive connection when the spindles are adjustably positioned.

Accordingly, an object of the present invention is to provide a new and improved machine tool having a support member and a movable member supported by the support member for movement in opposite directions relative thereto, and wherein a novel bearing support and guide arrangement of a practical, simple, and economical construction for supporting and guiding the movable member is provided and which is effective to support and accurately guide the movable member with only a minimum amount of friction engagement therebetween.

Another object of the present invention is to provide a new and improved machine tool having a support member and a movable member supported by the support member for movement in opposite directions relative thereto, and a guide arrangement including a pair of opposed guide surfaces on one of the members and a plurality of guide rollers carried by other of the members at spaced locations therealong and which are in rolling engagement with the guide surfaces, and wherein the rollers are adjustably positionable toward and from the guide surfaces so that the movable member can be rapidly and readily aligned with respect to the support member and so that its movement can be accurately guided and with only a minimum amount of frictional engagement occurring between the guide rollers and the guide surfaces.

A further object of the present invention is to provide a new and improved machine tool having a supporting member and a movable member supported by the supporting member for movement in opposite direction relative thereto, and in which the movable member is provided with one or more way engaging assemblies for engaging a way on the supporting member to hold the movable member in engagement with a main supporting way on the supporting member and prevent the movable member from tilting relative to the supporting member, the way engaging assembly including a gib carrying a bearing means and which is adjustably positionable along a tapered surface on a support carried by the movable member to adjustably position the bearing means relative to the way.

The present invention further provides a new and improved machine tool having a support member provided with a V-shaped way and a plurality of cylindrical rollers carried by the way and disposed in a staggered relation such that adjacent rollers have their side surfaces in engagement with the opposite sides of the V-shaped way, and a movable support member supported by the rollers and having a V-shaped recess where opposite sides engage the side surfaces of alternate ones of the rollers whereby the movable member is supported by the supporting member in a manner providing only a minimum amount of frictional engagement therebetween and which prevents movement of the movable member transverse to its direction of movement.

Another object of the invention is to provide a new and improved machine tool having a support assembly, a movable head supported by the support assembly for movement in opposite directions relative thereto; and a plurality of spindle assemblies carried by the head and each including a rotatable tool spindle, and a spindle drive assembly arranged and constructed to minimize the length of the spindles and the resulting torsion thereof, the spindle drive assembly including a plurality of shafts journaled for rotation in the head and drivingly connected to the spindles, and motor drive means for rotating the shafts.

A further object of the present invention is to provide a new and improved machine tool including a support assembly, a movable head supported by the support assembly for movement in opposite directions relative thereto, a plurality of spindle assemblies carried by the head, each of the spindle assemblies including a housing and a spindle rotatable therein, adjustment means connecting each of the spindle assemblies to the head for individual movement relative thereto, and a drive assembly for rotating the spindles.

Still another object of the present invention is to provide a new and improved machine tool having a support assembly, a movable head supported by the support assembly for movement in opposite directions relative thereto, a plurality of spindle assemblies carried by the head, each of the spindle assemblies including a housing and a spindle rotatable therein, adjustment means connecting each of the spindle assembly housings to the head for individual movement relative thereto, and a drive assembly arranged and constructed to minimize the length of the spindles and the resulting torsion thereof, the spindle drive assembly including a plurality of shafts journaled for rotation in the head and drivingly connected to the tool spindles, and motor drive means for rotating the shafts.

The invention further provides a new and improved machine tool having a support assembly, a movable head supported by the support assembly for movement in opposite directions relative thereto, a plurality of spindle assemblies carried by the head, each of the spindle assemblies including a housing, a spindle rotatable therein and spindle gear means operatively connected to the spindles, adjustment means connecting each of the spindle assembly housings in laterally spaced relation to an outer face of the tool spindle head for individual movement relative thereto, and a spindle drive assembly arranged and constructed to minimize the length of the spindles and the resulting torsion thereof, the spindle drive assembly including a plurality of shafts journaled for rotation in the head and drivingly connected to the spindles by wide face gears and relatively narrow face gears, whereby the spindle housings can be individually adjusted while maintaining driving engagement between the shafts and the spindles, and motor drive means for rotating the shafts.

The present invention resides in certain novel constructions and arrangement of parts, and further objects and advantages will appear from the following description of the preferred embodiment described with reference to the accompanying drawings, which form a part of this specification and in which like reference characters designate corresponding parts throughout the several views and wherein:

The provisions of the present invention are susceptible for use in various kinds or types of machine tools wherein a movable machine tool member or element, such as a table, saddle, etc. is supported by a support member, such as a bed, column, saddle, etc. for movement in opposite directions relative thereto, and for the purposes of illustration are herein shown and described as embodied in a vertical milling machine.

Figure 2:
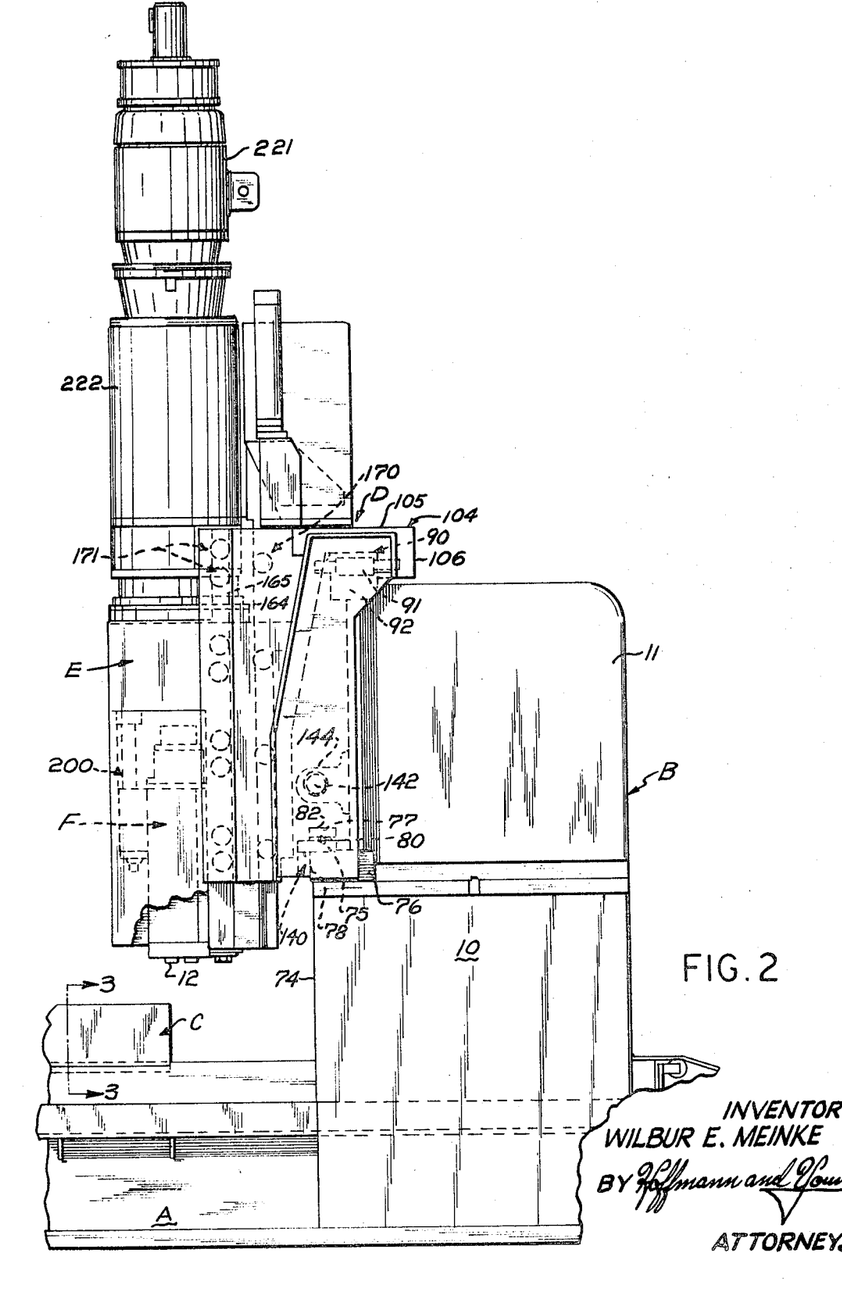
FIG. 2 is a fragmentary side elevational view of the milling machine shown in FIG. 1.

Referring to the drawings, the vertical milling machine there shown generally comprises an elongated bed A and a saddle support B including a pair of horizontally spaced vertically extending rail support columns 10 adjacent one end thereof, the right end as viewed in FIG. 2, and a horizontally disposed rail 11 supported by the columns 10. The bed A slidably supports a work support or table C for horizontal linear movement in opposite directions longitudinally thereof. The rail 11 slidably supports a saddle D for horizontal linear movement in opposite directions relative thereto and transversely to the direction of movement of the table C. The saddle D in turn slidably supports a spindle head E for vertical linear movement in opposite directions relative thereto toward and from the bed A. The spindle head E slidably supports a plurality of, preferably three, spindle assemblies F for vertical movement relative thereto. The spindle assemblies F are individually movable independently of one another and each are provided with a tool spindle 12 to which a suitable tool can be attached for pretorming a matchining operation on a workpiece or workpieces (not shown) carried by the table C.

Figure 3:
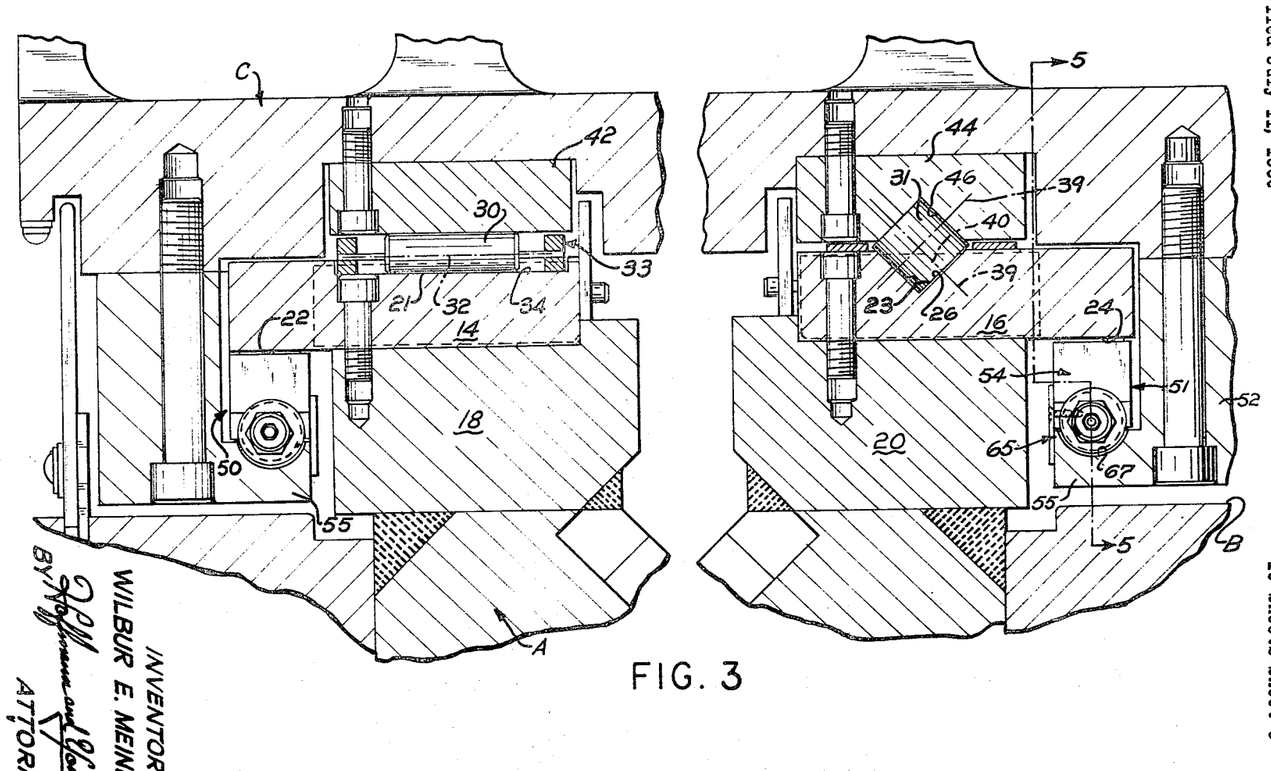
FIG. 3 is an enlarged fragmentary sectional view taken approximately along line 3—3 of FIG. 2.

The bed A, as best shown in FIG. 3, is a fabricated assembly which includes a pair of laterally spaced support members 14 and 16 extending longitudinally of the bed and parallel to one another and which are bolted to the top side of raised support portions 18 and 20 on the bed A. The support members 14 and 16 overhang or extend laterally beyond the outer longitudinally extending sides of the raised portions 18 and 20 and are provided with longitudinally extending, upwardly and downwardly facing hardened steel ways 21 and 22 and 23 and 24, respectively. The upwardly facing way 21 is planar and the upwardly facing way 23 is generally V-shaped with the opposed sides thereof having a 90° included angle. The downwardly facing ways 22 and 24 are planar.

The upwardly facing ways 21 and 23 respectively carry a plurality of roller bearings 30 and 31 at spaced locations longitudinally therealong and which extend upwardly therefrom. The roller bearings 30 are here shown as cylindrical rollers having their longitudinal axes 32 extending perpendicularly to the length of the way 21 and having their side surface in engagement therewith. The cylindrical rollers 30 are supported for rotation about their longitudinal axes and are retained at equally spaced locations along the way 21 by a suitable retainer or cage assembly 33 disposed within a recessed portion 34 of the upper side of the support member 14 and having longitudinally spaced cross members defining longitudinally spaced openings in which the rollers 30 are received. The bearings 31 carried by the V-shaped way 23 are here shown as right cylindrical rollers having a length equal or substantially equal to their diameters. The cylindrical rollers 31 are disposed such that their side surfaces engage one of the sides of the way 23 and one of their ends engage the other side of the way 23.

Figure 10:
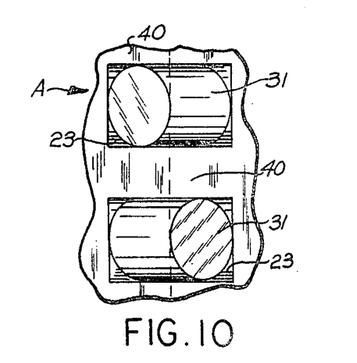
FIG. 10 is an enlarged fragmentary plan view of part of the machine shown in FIG. 3.
Figure 11:
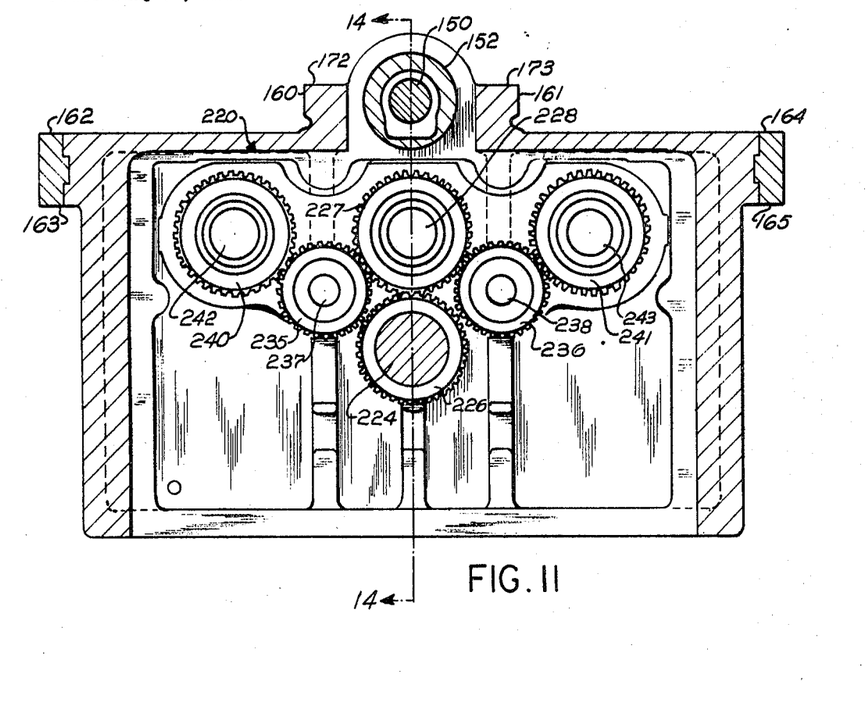
FIG. 11 is an enlarged fragmentary sectional view taken approximately along line 11—11 of FIG. 1.

As best shown in FIG. 10, the cylindrical rollers 31 are arranged in a staggered relation, that is, the longitudinal axes 39 of adjacent rollers 31 extend at right angles with each other and the longitudinal axes 39 of alternate ones of the rollers 31 extend parallel to each other. The rollers 31 are retained at equally spaced locations along the way 23 by spacer members 40 disposed between adjacent ones thereof. The spacer members 40 have parallel sides so as to allow the rollers 31 to freely rotate about their longitudinal axes 39.

The table C is supported adjacent its left and right ends, as viewed in FIG. 3, and in spaced relation with respect to the ways 21 and 23 by the roller bearings 30 and 31. To this end, the table C adjacent its left end has a longitudinally extending, hardened steel support member 42 bolted to its underside and which engages the side surfaces of the rollers 30 carried by the upwardly facing way 21. The table C adjacent its right end has a longitudinally extending, hardened steel support member 44 bolted to its underside. The support member 44 has a V-shaped recess whose intersecting sides form a 90° included angle with each side engaging the side surfaces of alternate ones of the rollers 31 carried by the upwardly facing way 23.

From the foregoing, it should be apparent that when the table C is moved relative to bed A along the ways 21 and 23, it will roll on the rollers 30 and 31, since the latter are free to rotate about their longitudinal axes. This bearing support arrangement for the table C minimizes frictional resistance to movement of the table since engagement between the table C and the side surfaces of the rollers 30 and 31 is essentially a line contact. It should also be apparent that the construction and arrangement of the V-shaped ways 23 and 46 and the roller bearings 31 also accurately guides the movement of the table C along the ways 21 and 23 by preventing movement of the table C transversely of the way 23 and therefore, the need for a separate lateral guide structure, which is usually required to prevent lateral movement of a table, is eliminated.

To prevent the table C from deflecting or tilting either while stationary or during its linear movement due to an unbalanced load condition thereon and/or due to the load placed on the workpiece during a machining operation, a plurality of way engaging assemblies 50 and 51 carried by the table C adjacent its left and right ends, as viewed in FIG. 3, and which respectively engage the downwardly facing ways 22 and 24 at longitudinally spaced locations therealong are provided. Since both way engaging assemblies 50 and 51 are of an identical construction, only the way engaging assembly 51 for engaging the downwardly facing way 24 on the bed A will be described in detail.

The way engaging assemblies 51 each comprise a bracket member 52 bolted or otherwise fixed to the underside of the table C adjacent its right end thereof, as viewed in FIG. 3, and a pair of spaced roller bearing subassemblies 53 and 54 supported by the bracket 52. The bracket 52 is generally L-shaped in cross section and has a support portion 55 disposed directly beneath but spaced from the way 24. The support portion 55 extends longitudinally of the way 24 and has upper planar surfaces 56 and 57, see FIG. 5, which are linearly tapered in opposite longitudinal directions proceeding from their inner ends toward their left and right ends. The linear taper of the upper surfaces 56 and 57 is such that they diverge from the way 24 proceeding from their inner ends toward their left and right ends.

Figure 5:
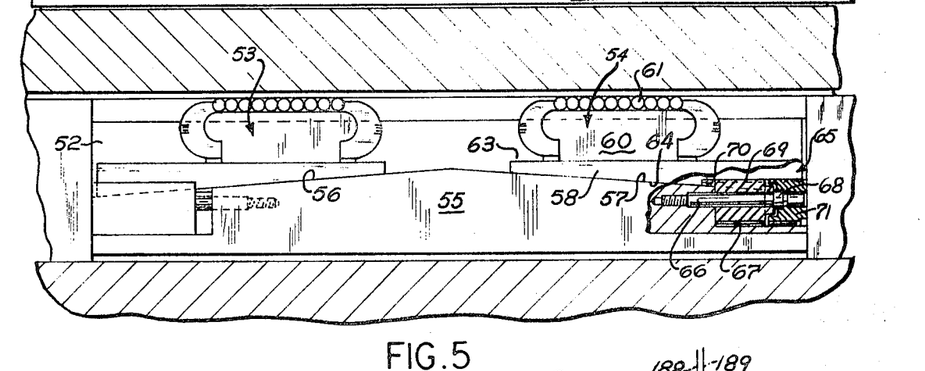
FIG. 5 is an enlarged fragmentary sectional view taken approximately along line 5—5 of FIG. 3.

The roller bearing subassemblies 53 and 54 are of an identical construction, and therefore, only the rightmost roller bearing subassembly 54, as viewed in FIG. 5, will be described in detail. The roller bearing subassembly comprises a gib 58 and a bearing means 60 mounted on the gib 58. The bearing means 60 can be of any suitable or conventional construction, but preferably comprises a housing having a plurality of rollers 61 which move in an endless path in the housing and which rollingly engage the downwardly facing way 24, and can be of the type shown in U.S. Patent No. 3,003,828 or manufactured by Sculley Jones and Company, Chicago, Ill., as shown in catalog No. 22–62 printed Apr. 1, 1962.

The gib 58 has a flat upper surface 63 which extends parallel to the downwardly facing way 24 and a lower linearly tapered surface 64 which engages the upper surface 57 of the support portion 55 and which is linearly tapered so as to be complementary therewith.

The gib 58 is adjustably positionable along the tapered upper surface 57 of the support portion 55 to adjustably position the rollers 61 of the bearing means 60 toward and from the downwardly facing way 24 by an adjusting means 65. The adjusting means 65 comprises a stud 66 carried by the support portion 55 and which extends within an upwardly facing arcuate recess 67 at the right end of the support portion 55, as viewed in FIG. 5. Rotatably supported on the stud 66 between the inner side wall of the recess and an annular shoulder 68 on the stud 66 is an externally threaded adjusting screw 69 which is in threaded engagement with threads 70 formed on the lower side of the gib 58. From the foregoing, it should be apparent that by rotating the screw 69, the gib 58 is caused to be moved longitudinally along the tapered surface 57 on the support portion 55. To lock the gib 58 in any desired or adjusted position, a locking screw 71 rotatably suported on the stud 66 at its outer end and which is in threaded engagement with the threads 70 on the gib is provided.

Figure 1:
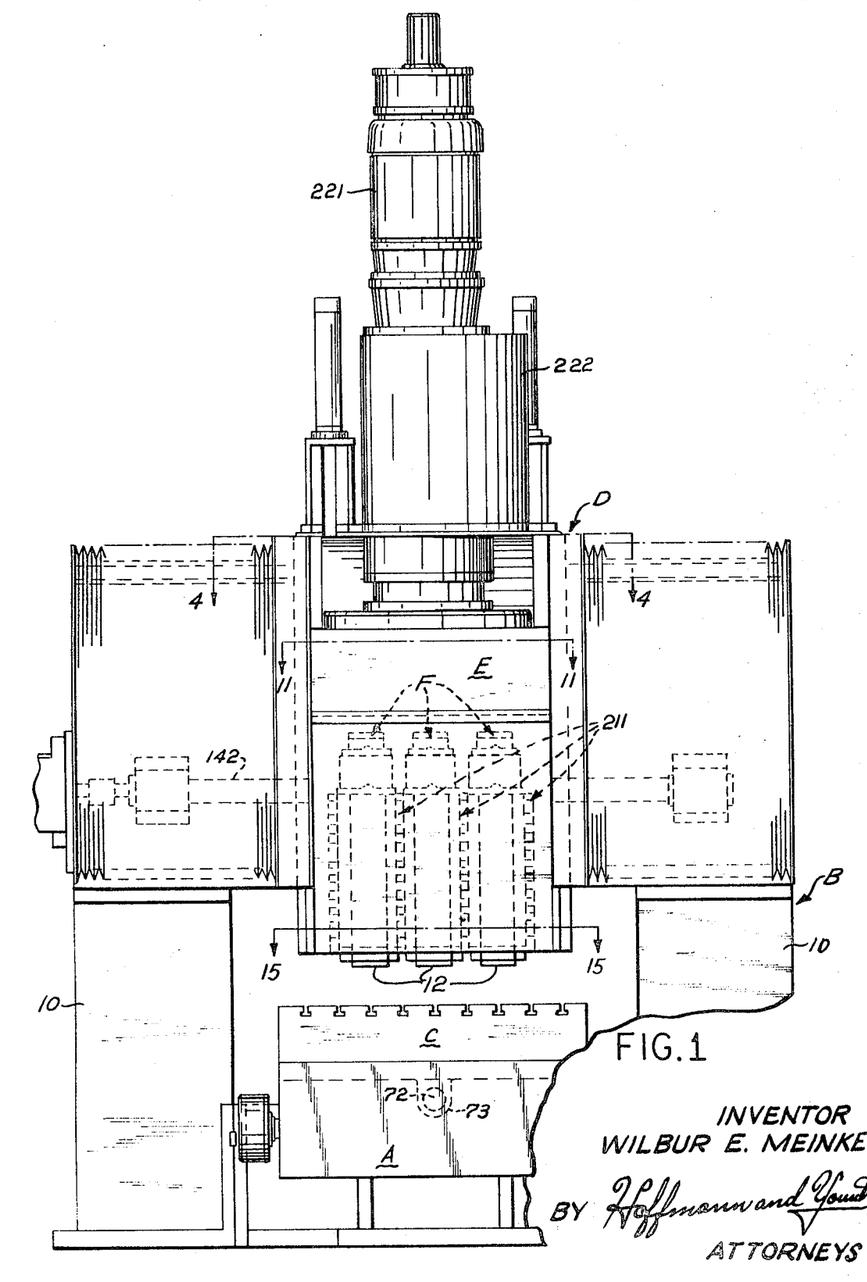
FIG. 1 is a fragmentary front elevational view of a vertical milling machine embodying the present invention.

The table C is adapted to be linearly moved in opposite directions relative to the bed A by a lead screw 72 (see FIG. 1) having its opposite ends rotatably supported within the bed A and which is threadably engaged with a nut 73 carried on the underside of the table C. The lead screw 72 is adapted to be rotated in opposite directions by a suitable reversible hydraulic motor operatively connected with one end thereof.

Figure 9:
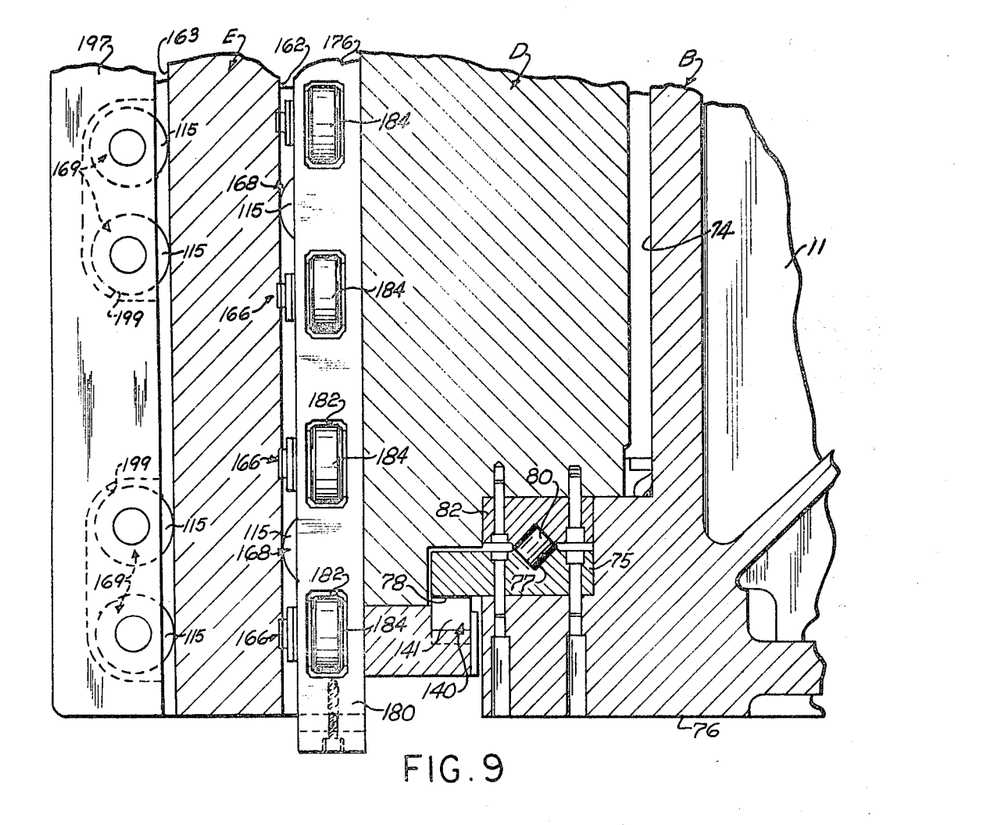
FIG. 9 is an enlarged fragmentary sectional view taken approximately along line 9—9 of FIG. 4.

As previously mentioned, the rail 11 of the saddle support B slidably supports the saddle D for horizontal linear movement in opposite directions relative thereto and transversely of the direction of movement of the table C. As best shown in FIG. 2, the rail 11 has a left side 74 which is of a generally stepped configuration. The rail 11 intermediate its upper and lower ends adjacent its left side 74 has a horizontally disposed member 75 extending longitudinally thereof which is bolted to a raised support portion 76 thereon. As best shown in FIG. 9, the support member 75 overhangs or extends laterally beyond the left side edge of the raised portion 76 and is provided with upwardly and downwardly facing hardened steel ways 77 and 78, the latter way 78 being formed by the downwardly facing side of the overhanging portion of the member 75. The upwardly facing way 77 is V-shaped with the sides of the V forming a right angle therebetween. The V-shaped way 77, in the preferred embodiment, extends perpendicularly to the upwardly facing ways 21 and 23 of the table A and carries a plurality of roller bearings here shown as cylindrical rollers 80, at spaced locations therealong and with the cylindrical rollers 80 being of the same shape and arranged in a staggered relation in the same manner as the rollers 31 carried by the way 23 on the bed A.

The saddle D is supported adjacent its right end, as best shown in FIG. 9, by the roller bearings 80. The saddle has a horizontally extending, hardened steel support member 82 bolted to its underside. The support member 82 has a downwardly facing V-shaped recess whose intersecting sides form a right angle with each side engaging the side surfaces of alternate ones of cylindrical rollers 80. The bearings 80 support the saddle D in spaced relation to the upwardly facing way 77.

The provision of the V-shaped way 77 and roller bearings 80 provides a support for the saddle D in which only a minimum amount of frictional engagement occurs between the saddle and the rail support B, and also provides a guide means for laterally guiding the lower portion saddle throughout its movement. In other words, the lower portion of the saddle will not move transversely of the direction of movement of the V-shaped way and thus, any need for providing additional side guide structure at the lower portion of the saddle D is eliminated.

In accordance with one of the provisions of the present invention, a novel guide arrangement, indicated generally by reference numeral 90, is provided for laterally guiding the upper portion saddle D as it is linearly moved relatively to the rail 11 of the saddle support B and for preventing the saddle D, which extends upwardly from the way 77, from pivoting about the rollers 80. The guide arrangement 90 comprises a horizontally extending guide member 91 bolted to a raised portion 92 at the upper left end of the rail, as viewed in FIG. 2. The member 91 has a pair of opposed vertically disposed planar, hardened steel ways or guide surfaces 94 and 95 which extend longitudinally of the rail and in a direction parallel to the ways 77 and 78 on the rail.

Figure 12:
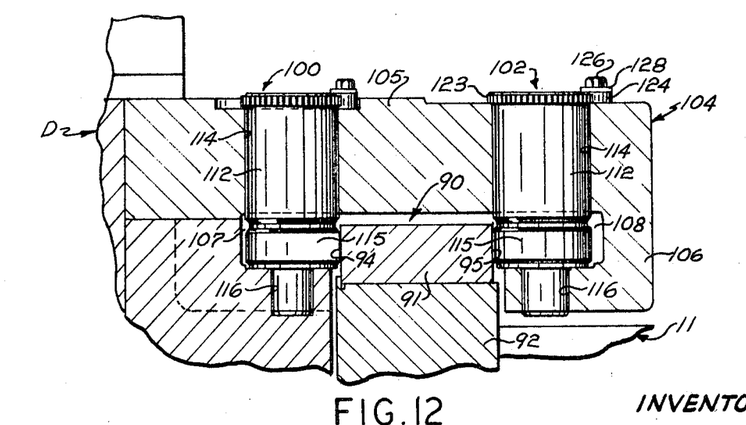
FIG. 12 is an enlarged fragmentary sectional view with portions in elevation taken approximately along line 12—12 of FIG. 4.

The guide arrangement 90 further comprises first and second pluralities of spaced way or guide engaging assemblies 100 and 102 for engaging the ways 94 and 95, respectively, at spaced locations therealong. The way engaging assemblies 100 and 102 are carried by a bracket, generally designated by reference numeral 104, extending lengthwise of the main body portion of the saddle D and bolted to its right upper end, as viewed in either FIG. 2 or 12. The bracket 104 overhangs the right side of the saddle and comprises a horizontally extending portion 105 and a U-shaped right end portion 106. As best shown in FIG. 12, the horizontally extending portion 105 of the bracket means 104 has an intermediate portion which is spaced upwardly from the main body portion of the saddle D to define a horizontally extending recess 107 therebetween and the spaced legs of the U-shaped portion 106 of the bracket means 104 define a horizontally extending recess 108 therebetween.

Figure 6:
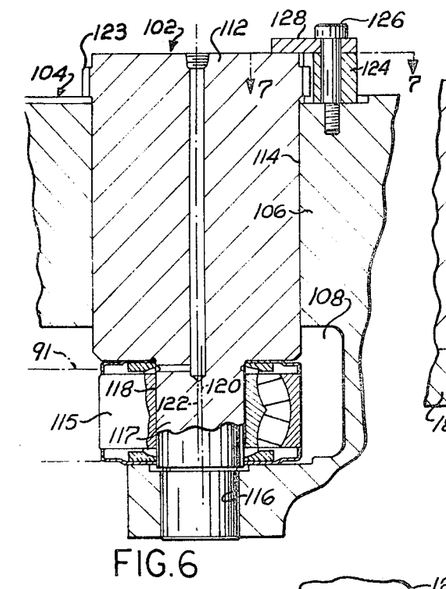
FIG. 6 is an enlarged fragmentary sectional view taken approximately along line 6—6 of FIG. 4.

Each of the way engaging assemblies 100 and 102 are of an identical construction, and therefore, only the left most way engaging assembly 102, as viewed in FIG. 4, will be described in detail. Referring to FIG. 6, the way engaging assembly 102 comprises a shaft 112 having its opposite ends rotatably supported within aligned openings 114 and 116 in the legs of the U-shaped end portion 106 of the bracket 104, and a cylindrical roller 115 rotatably journaled on an intermediate portion 117 of the shaft 112, which portion 117 is located in the recess 108. The roller 115 is of a relatively large diameter or size and can be of any suitable or conventional construction, such as the rollers manufactured by SKF Industries, Philadelphia, Pa. The roller 115 is rotatably journaled or supported on an eccentric annular surface 118 of the reduced portion 117, that is, the central axis 120 of the reduced portion 117 of the shaft 112 is slightly radially spaced from the central axis of rotation 122 of the shaft 112.

Figure 7:
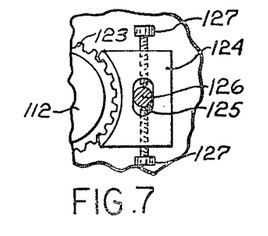
FIG. 7 is a fragmentary sectional view taken approximately along line 7—7 of FIG. 6.

The eccentric portion 117 of the shaft 112 provides a means for adjusting the roller 115 relative to the way 95 and in a direction perpendicular thereto. The roller 115 is adjusted relative to the way 95 by rotating the shaft 112 which in turn causes the eccentric portion 117 thereof to linearly move the roller 115 relative to the way 95. In order to provide for fine adjustment of the roller 115 relative to the way 95, the shaft 112 is provided with an annular gear 123 at its upper end, as viewed in FIGS. 6 and 7, which is in meshed engagement with a rack or gear sector 124. The gear sector 124 has a slot 125 through which a screw 126 for mounting the gear sector 124 on the bracket 104 extends. The gear sector 124 is reciprocably movable relative to the screw 126 to rotate the gear 123 and hence, the shaft 112 by adjusting a pair of opposed screws 127 which are threadably engaged with the gear sector 124 and which extend within the slot 125 and engage the screw 126 at diametral opposite locations thereon. When both adjusting screws 127 have their inner ends in engagement with the screw 126, the gear sector 124 is locked against movement relative to the screw 126 and the gear 123 and shaft 112 are locked against rotation and hence, the roller 115 is locked in its adjusted position relative to the way surface 95. The shaft 112 is retained in its operative position shown in FIG. 6 by a flat plate member 128 which overlies a portion of the upper end of the shaft 112 and the gear sector 124 and the screw 126 which extends through an aperture in the plate 128 and the slot 125 of the sector 124 and which is threadably engaged with an aligned thread opening in the bracket 104.

Figure 4:
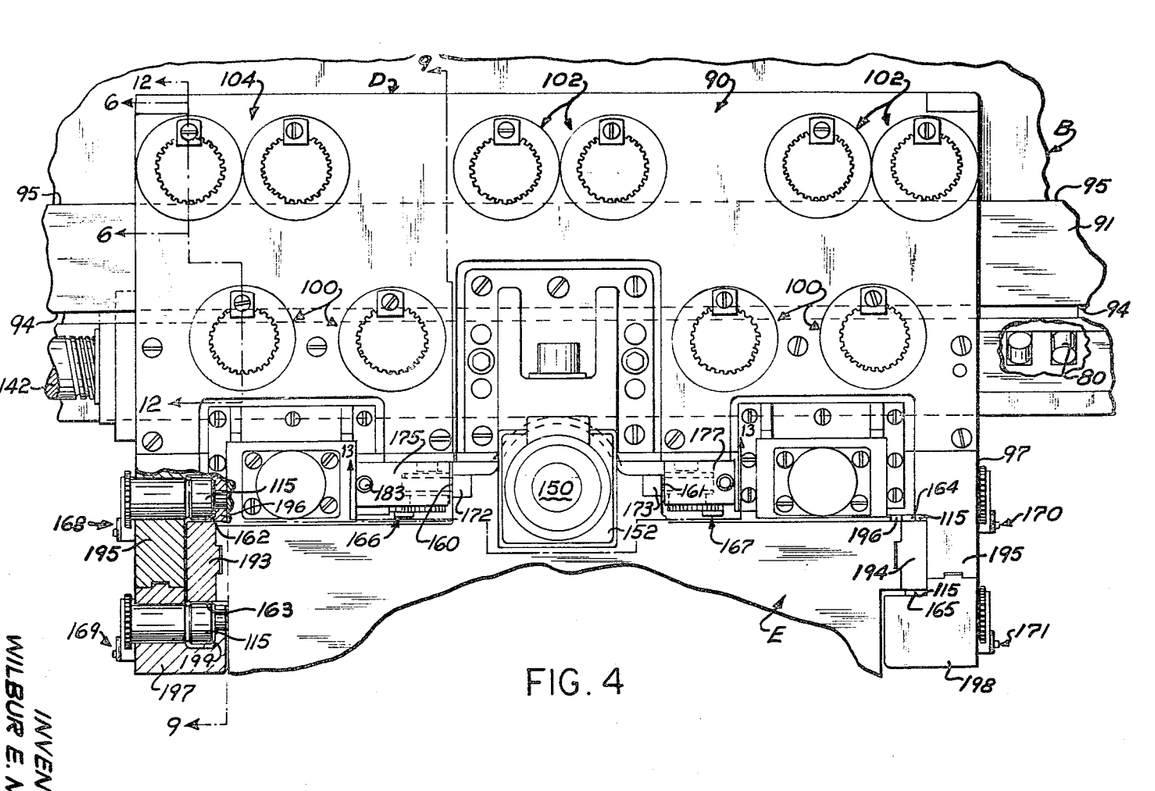
FIG. 4 is an enlarged fragmentary plan view of part of the machine shown in FIG. 1, with certain portions thereof shown on section, and looking in the direction of the arrow 4—4 of FIG. 1.

As best shown in FIG. 4, the rollers 115 of the way engaging assemblies 100 and 102 rollingly engage the ways 94 and 95 at longitudinally spaced locations therealong, and that since the rollers 115 are of a large diameter and adjustably positionable toward and from the ways 94 and 95 the saddle can be accurately aligned with respect to the ways 94 and 95. The provision of the adjustable rollers 115 provides a guide arrangement which very accurately guides the movement of the saddle D and which prevents the saddle from pivoting about the cylindrical roller bearings 80 from the way 77. Also, it should be noted that by providing rollers, the engagement between the ways and the way engaging assemblies is a line contact and thus, the saddle is effectively guided with only a minimum amount of frictional engagement therebetween.

To prevent the saddle from being moved upwardly relative to the way 77, a plurality of spaced way engaging assemblies 140 for engaging the downwardly facing way 78 are provided. The way engaging assemblies 140 are of an identical construction to the way engaging assemblies 50 and 51 for engaging the downwardly facing ways 22 and 24 on the bed A and with their bearing means 141 being adjustably positionable toward and from the way 78 in the same manner that the bearing means 60 are adjustably positionable toward and from the ways 22 and 24.

The saddle D is adapted to be linearly moved relative to the rail by a rotatable lead screw 142 having its opposite ends rotatably supported by the saddle support B and which is in threaded engagement with a nut 144 fixed to the left side of saddle D. The lead screw 142 is adapted to be rotated in opposite directions by a suitable or conventional hydraulic motor (not shown) which is operatively connected to the lead screw 142 at one end thereof.

The spindle head E is slidably supported by the saddle D and is adapted to be moved relative to the saddle D by a lead screw 150 having its opposite ends rotatably supported by the saddle D and which is in threaded engagement with a nut 152 carried at the upper end of the spindle head E. The lead screw 150 is adapted to be rotated in opposite directions by a suitable reversible hydraulic motor (not shown) operatively connected with the upper end of the lead screw 150.

Provision is made to enable the spindle head E to be accurately aligned with respect to the saddle D and for accurately guiding its movement when moved vertically relative to the saddle D. As best shown in FIG. 4, the spindle head E is provided with opposed pairs of vertically extending guide surfaces 160 and 161, 162 and 163 and 164 and 165, and the saddle D carries opposed pluralities of guide assemblies, generally designated by reference numerals 166 and 167 and 168 and 169 and 170 and 171 for respectively engaging the opposed pairs of guide surfaces on the spindle head E at spaced vertical locations therealong to guide the movement of the latter. The opposed pair of guide surfaces 160 and 161 are of hardened steel and planar and respectively face toward the left and right, as viewed in FIG. 4. The guide surfaces 160 and 161 are formed on the left and right sides of vertically extending members 172 and 173 which are bolted to the left and right sides of a rearwardly extending portion 174 located intermediate the left and right sides of the spindle head E, respectively.

Figure 13:
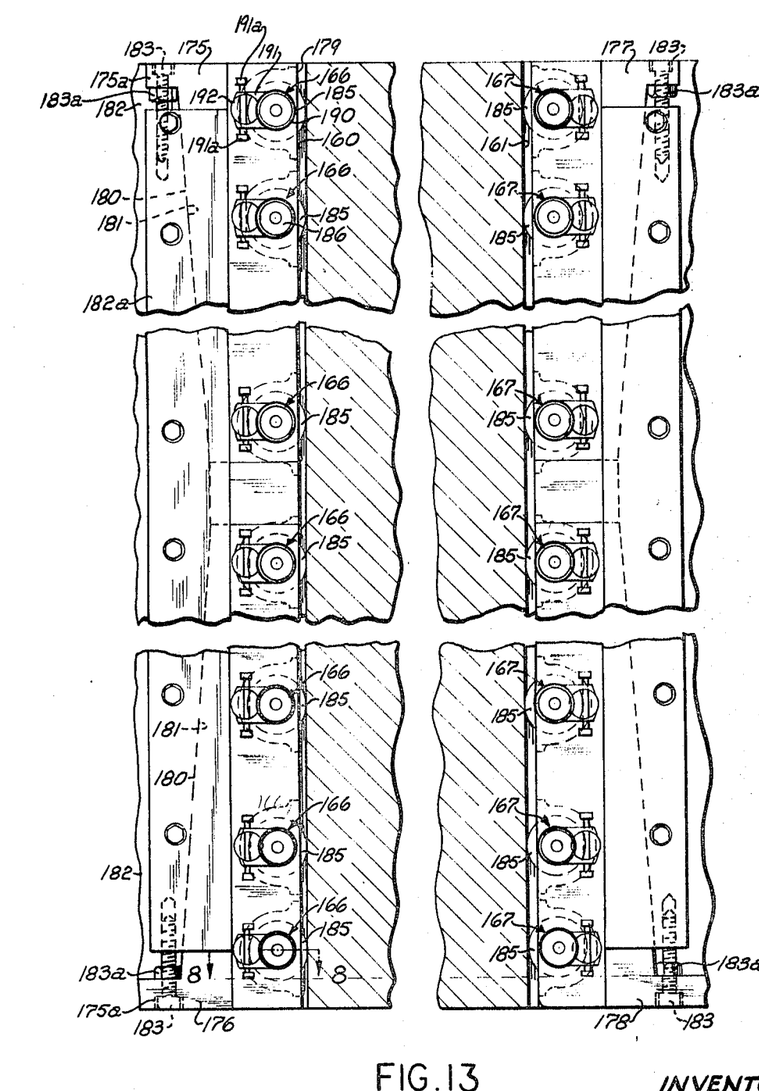
FIG. 13 is an enlarged fragmentary sectional view with portions in elevation taken approximately along line 13—13 of FIG. 4.

As best shown in FIG. 13, the upper and lower ones of the opposed plurality of spaced guide assemblies 166 and 167 for engaging the side guides 160 and 161 are respectively carried by vertically extending gibs 175 and 176 and 177 and 178 slidably supported by the saddle D adjacent the guides 160 and 161. The gibs 175, 176, 177 and 178 are of an identical construction and each is supported by the saddle D in the same manner and therefore only the gib 175 and the manner in which it is supported by the saddle D will be described in detail, and corresponding parts will be given the same reference numerals on the drawings. The gib 175 has a forward planar surface 179 extending parallel to the guide surface 160 and a rearward surface 180 which is linearly tapered and converges toward the guide surface 160. The rearward surface 180 is slidably engaged with a complementary linearly tapered surface 181 on a vertically extending support portion 182 formed integral with the saddle D.

The gib 175 is adjustably positionable in a vertical direction along the surface 181 of the support portion 182 to simultaneously adjustably position all of the guide assemblies 166 carried by the gib 175 relative to the guide surface 160 by an adjustment means. The adjustment means comprises a cap screw 183 and a nut 183a. The cap screw 183 extends through an opening in a flange 175a integral with the gib 175 at its upper end and is threadably received in an aligned threaded opening in the support portion 182. The flange 175a is disposed above the upper end of the support portion 182 and the nut 183a, which is carried between the flange 175a and the support portion 182 is adapted to be moved into engagement with the underside of the flange 175a to hold the latter in abutting engagement with the head of the screw 183 to prevent relative movement between the gib 175 and the support portion 182. From the foregoing, it should be apparent that by adjusting the screw 183 and the nut 183a, the gib 175 can be vertically moved relative to the support portion 182, which movement in turn causes the upper ones of the guide assemblies 166 to be moved relative to the guide surface 160 in a direction perpendicular thereto due to the complementary tapered surfaces 180 and 181. Movement of the gib 175 in a vertical direction is guided by the front face of the saddle D and a vertically extending member 182a bolted to the support portion 182.

The lower gib 176 is adjustably positionable in the same manner that the gib 175 is adjustably positionable except that the head of the cap screw 183 abuts the flange 175a of the gib 176 and extends through an opening therein and is threadably received in an aligned threaded opening in the lower end of the support portion 182. Each of the gibs is provided with vertically spaced recesses 184, facing toward the opposed guides 160 and 161 and in which relatively large diameter rollers 185 of the guide engaging assemblies 166 and 167 are disposed.

Figure 8:
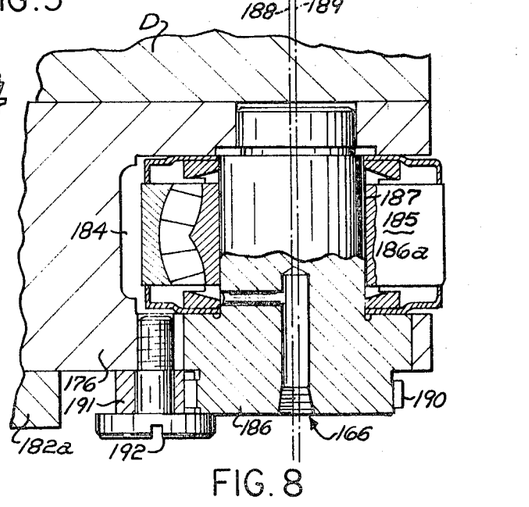
FIG. 8 is an enlarged fragmentary sectional view taken approximately along line 8—8 of FIG. 13.

The guide engaging assemblies 166 and 167 are each of an identical construction and are respectively rotatably supported by the gibs in the same manner, and therefore only the left lowermost guide assembly 166, as viewed in FIG. 13, and the manner in which it is supported by the gib 176 will be described in detail. As best shown in FIG. 8, the guide engaging assembly 166 comprises a shaft 186 having its opposite ends rotatably supported within aligned openings in the portions of the gib 176 forming the opposite sides of the recess 184. The cylindrical roller 185 is rotatably journaled on an intermediate portion 186a of the shaft 186, which portion 186a is located in the recess 184. The roller 185 is rotatably journaled or supported on an eccentric annular surface 187 of the reduced shaft portion 186a, that is, the central axis 188 of the reduced portion 186a of the shaft 186 is slightly radially spaced from the central axis of rotation 189 of the shaft 186.

The eccentric portion 187 of the shaft 186 provides a means for adjusting the roller 185 relative to the forward planar surface 178 of the gib 176 and/or the guide 160 and in a direction perpendicular thereto. The roller 185 is adjusted relative to the gib 176 by rotating the shaft 186 which in turn causes the concentric portion 187 thereof to linearly move the roller 185 relative to the surface 178 of the gib 176. In order to provide for fine adjustment of the roller 185 relative to the surface 178 of the gib 176 and/or way 95, the shaft 186 is provided with an annular gear 190 at its lower end, as viewed in FIG. 8, which is in meshed engagement with a rack or gear sector 191. The rack 191 is of the same construction as the rack 124 of the way engaging assembly 102, and is reciprocably movable by adjusting a pair of opposed adjusting screws 191a whose inner ends cooperably engaging a screw 192 extending through the rack to rotate the gear 190 on the shaft 186 and in the same manner as that previously described in connection with the way engaging assembly 102. When the shaft 186 has been rotated to position the roller 185 relative to the surface 178, it can be locked in that position by the adjusting screws 191a. The rack 191 is retained in meshed engagement with the gear 190 and the shaft 186 is retained in the position shown in FIG. 8 by the screw 192. The screw 192 has a head portion which overlies a portion of the lower end of the shaft 186 and the gear sector 191 and which extends through an aperture in the gear sector 191 and which is threadably engaged in an aligned threaded opening in the gib 176. From the foregoing, it should be apparent that by loosening the screw 192 the gear sector 191 can be reciprocated by adjusting the screws 191a to rotate the shaft 186, and by drawing the screw 192 down tightly against the gear sector 191, the latter clampingly engages the lower end of the shaft 186, as viewed in FIG. 8, to retain the latter in its operative position relative to the gib.

The provision of the tapered gibs 175, 176, 177 and 178 for carrying a plurality of way engaging assemblies enables a plurality of the way engaging assemblies to be simultaneously adjustably positioned relative to the adjacent guide surface on the spindle head E by merely adjustably positioning the gib along the tapered surface of the support portion 180 and thus, enables the spindle head E to be rapidly aligned with respect to the saddle D.

Referring to FIG. 4, the opposed guide surfaces 162 and 163 and 164 and 165 are planar and respectively face rearwardly and forwardly of the spindle head E and extend perpendicular to the guide surfaces 160 and 161. The guide surfaces 162 and 163 and 164 and 165 are preferably of hardened steel and are on the rearward and forward ends of vertically extending members 193 and 194 bolted to the left and right sides of laterally projecting portions and at the rearward end of the spindle head E. respectively.

The opposed plurality of spaced guide assemblies 168 and 169 and 170 and 171 for respectively engaging the rearwardly facing guides 162 and 163 and 164 and 165 at spaced vertical locations therealong are each of an identical construction to the guide assemblies 102 shown in FIG. 6 and corresponding parts thereof have been given the same reference numerals. The guide assemblies 168 and 170 are supported at vertically spaced locations by a pair of vertically extending support portions 195 and 196 projecting forwardly of and formed integral with the saddle D at its left and right ends of the saddle D, as viewed in FIG. 4. The guide assemblies 168 and 170 are rotatably supported by the support portions 195 and 196 for rotation about horizontal axes and in the same manner that the guide assemblies 102 are supported between the spaced legs of the U-shaped end portion 106 of the bracket 104. The plurality of spaced guide assemblies 169 and 171 for respectively engaging the forwardly facing guides 163 and 165 at spaced vertical locations therealong are rotatably supported at spaced vertical locations by vertically extending support members or brackets 197 and 198 fixed to the projecting portions 195 of the saddle D. The members 197 and 198 have vertically spaced recesses 199 therein in which the rollers 115 of the guide assemblies 169 and 171 are disposed and the guide assemblies 169 and 171 are supported for rotation by the support members 197 and 198 about horizontal axes in the same manner that the guide assemblies 102 are rotatably supported by the bracket 104. Alternately, the upper and lower ones of the vertically spaced guide assemblies 168, 169, 170 and 171 could be supported by adjustably positionable tapered gibs and in the same manner that the guide assemblies 165 and 166 are supported by tapered gibs.

From the foregoing, it should be apparent that the spindle head E can be accurately aligned for vertical movement with respect to the saddle D by suitably adjusting the guide assemblies and that it is accurately guided for vertical movement relative to the saddle D and with only a minimal amount of frictional engagement therebetween.

Figure 14:
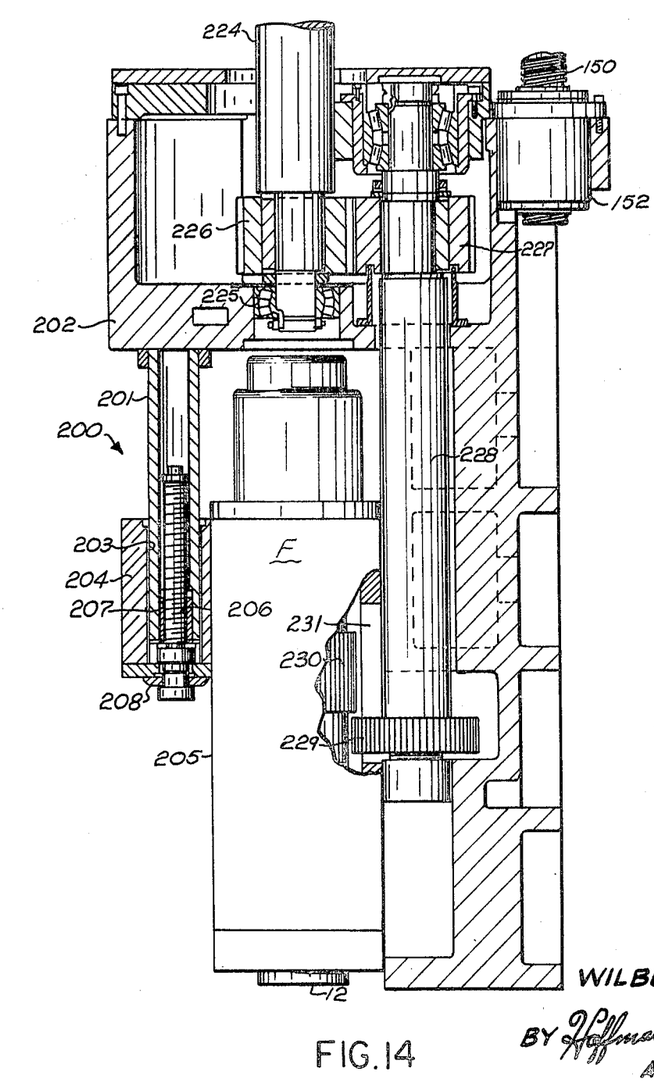
FIG. 14 is an enlarged fragmentary sectional view taken approximately along line 14—14 of FIG. 11.

As previously mentioned, the spindle assemblies F are supported by the spindle head E for vertical linear movement relative thereto. As best shown in FIG. 14, each of the spindle assemblies F is supported by an adjustable support means 200 which comprises a vertically disposed hollow member 201 having one end fixed or secured to the underside of a forwardly projecting portion 202 at the upper end of spindle head E and the other end slidably received within an opening 203 in a support member 204 welded or otherwise secured to the forwardly facing side of a housing 205 of the spindle assembly F. The support member 204 carries a vertically disposed screw 206 which projects upwardly into the hollow member 201 and is in threaded engagement with a nut 207 fixed within the lower end of the hollow member 201. The screw 206 projects downwardly from the support member 204 and has a dial 208 fixed to its lower end. From the foregoing, it should be apparent that the spindle assembly F can be adjustably positioned vertically relative to the spindle head E by suitably rotating the screw 206.

Figure 15:
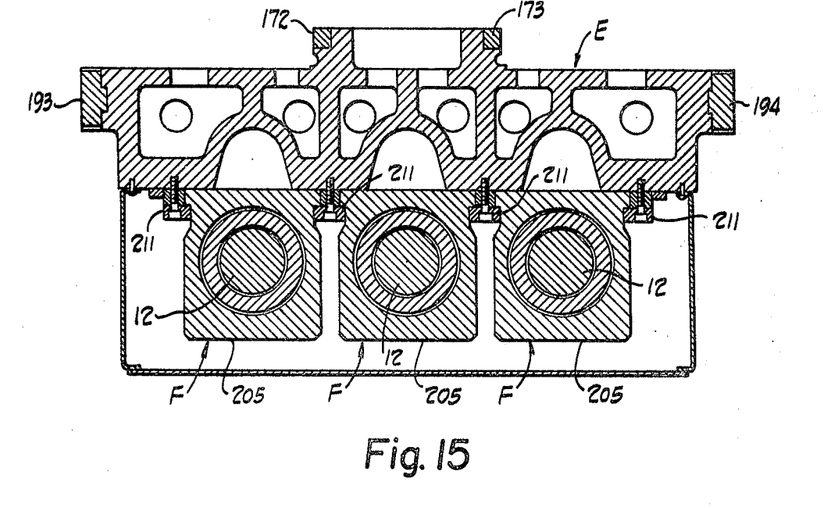
FIG. 15 is an enlarged fragmentary sectional view taken approximately along line 15—15 of FIG. 1.

The spindle assemblies F are vertically movable along vertically extending ways or guides 211 (see FIG. 1 and FIG. 15) secured to the front side of the spindle head E at laterally spaced locations thereon. The lateral spacing between the spindle assembly housings 205 and the arrangement of the housings on the outside face of the head E improves the cooling of the spindle assemblies. The spindle assemblies F can be of any suitable or conventional construction and since they do not per se form a part of the present invention, they will not be described in detail and only those features which are necessary for a complete understanding of the operation of the milling machine will be hereinafter described.

The tool spindles 12 of each of the spindle assemblies F are adapted to be rotated at various rates of speed by a drive assembly, designated generally by reference numeral 220. The drive assembly 220 comprises a reversible electric motor 221 which is operatively connected with a change speed planetary gear transmission 222. Any suitable or conventional change speed gear transmission can be employed and since it does per se form a part of the present invention it will not be described in detail.

The change speed gear transmission 222 has an output shaft 224 having its lower end rotatably journaled in a bearing means 225 carried in the spindle head E. The output shaft 224 adjacent its lower end has fixed thereto a spur gear 226 which is in constant match with a spur gear 227 fixed to a vertically disposed shaft 228 having its opposite ends rotatably journaled in the spindle head E. The shaft 228 adjacent its lower end has a spur gear 229 fixed thereto which is adapted to be meshingly engaged with a wide-faced gear 230 fixed to the tool spindle 12 of the middle spindle assembly F intermediate its ends. The housing 205 of the spindle assembly F has a suitable vertically extending slot or opening 231 therein through which the gear 229 projects.

The gear 227 is also in constant mesh with the pair of idler gears 235 and 236 respectively fixed to a pair of shafts 237 and 238 having their opposite ends rotatably journaled in an upper portion of the spindle head E. The idler gears 235 and 236 are in constant mesh with spur gears 240 and 241 respectively fixed to vertically disposed shafts 242 and 243 adjacent their upper ends. The shafts 242 and 243 are rotatably journaled at their opposite ends within the spindle head E, respectively, and carry spur gears (not shown) fixed thereto adjacent their lower end. These latter gears are adapted to meshingly engage wide-face gears (not shown) fixed to the tool spindles 12 of the left and right spindle assemblies F, as viewed in FIG. 1. The drive assembly including the vertically disposed shafts 228, 242 and 243 which are drivingly connected to the spindles F near their lower tool supporting ends minimizes the length of the spindles and the resulting torsion thereof when the spindles are rotatably driven.

The provision of the wide-faced gears 230 on the spindles 12 of spindle assemblies F and the slots 231 enable the spindle assemblies to be adjustably positioned vertically relative to a spindle head E a predetermined distance while maintaining a driving connection therebetween. Provision is also made, however, to enable the wide-faced gears 230 to be disengaged from the gears 229 to disconnect the driving connection between the drive means and spindle 10. To this end, the linear adjustment provided by the screws 206 is greater than the linear or axial extent of the wide-faced gears 230 so that the spindle assemblies F can be moved upwardly to the position shown in FIG. 14 in which the wide-faced gears 230 are disengaged from the gears 229 of the drive means.

From the foregoing description of the illustrated embodiments of the present invention it will be apparent that the objects heretofore enumerated and others have been accomplished and that a new and improved machine tool has been provided which is capable of performing extremely accurate machining operations. It will also be apparent from the foregoing that novel guide and support structures and arrangements have been provided for guiding and supporting a movable member for movement relative to a supporting member and in which the relative movement is effected with only a minimal amount of frictional engagement therebetween. It will further be apparent that the present invention has provided a novel arrangement and construction including a plurality of spindle assemblies, each of which is individually adjustable in opposite directions relative to a tool spindle head, and a drive assembly which minimizes the length of the tool spindles and the resulting torsion thereof during rotation of the spindles.

Although the machine tool of the present invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In a machine tool; a support member; a movable member supported by said support member for movement in opposite directions relative thereto; one of said members having a pair of opposed, laterally spaced guide surfaces extending in the direction of movement of said movable member; a first plurality of spaced guide assemblies carried by the other of said members for engaging one of said pair of guide surfaces for guiding the movement of said movable member; each of said guide assemblies including roller means in rolling contact with said one guide surface and means for adjustably positioning said roller means of at least some of said guide assemblies toward and away from said one guide surface; gib means slidably supported by the other of said members for adjustment toward and away from the other of said pair of guide surfaces; a second plurality of spaced guide assemblies carried by said gib means for engaging the other of said pair of guide surfaces for guiding the movement of said movable member, each of said guide assemblies comprising a shaft supported by a support portion on said other of said members, a roller rotatably supported on the shaft for rotation about its axis, and means operatively associated with said roller for adjustably positioning the latter toward and away from said other of said guide surfaces; and means adjustably positioning said gib means on said other of said members to simultaneously adjustably position the rollers of said second guide assemblies toward and away from said other of said pair of guide surfaces.

2. In a machine tool, as defined in claim 1, and wherein said rollers of said second plurality of guide assemblies are rotatably supported on an eccentric surface on the shaft and the shaft is rotatably supported by said support portion on said other member whereby rotation of the shaft effects a linear movement of said roller toward and from said other of said guide surfaces, and locking means for locking said shaft against rotation in any adjusted position.

3. In a machine tool; a support member having first and second upwardly and downwardly facing ways; a first plurality of spaced bearings carried by said first upwardly facing way and extending thereabove; a second plurality of spaced cylindrical roller bearings carried by said second upwardly facing way and extending thereabove, said second upwardly facing way being V-shaped and said cylindrical roller bearings being supported by said V-shaped way in a stagger relation with adjacent ones having their axes extending transversely of one another and with alternate ones having an axis extending parallel with one another; a movable member supported on said first and second pluralities of bearings for movement in opposite directions along said first and second ways relative to said support member; said movable member having a downwardly facing V-shaped support portion for cooperatively engaging said second plurality of cylindrical roller bearings; first and second way engaging assemblies carried by said movable member for engaging said first and second downwardly facing ways, respectively; each of said first and second way engaging assemblies comprising a bracket member bolted to the underside of said movable member and having a support portion disposed beneath said downwardly facing way; said support portion having planar surfaces which are linearly tapered in opposite longitudinal directions and which converge toward said downwardly facing way proceeding from the ends of said support portion toward its center, a gib having tapered surfaces complementary with the tapered surfaces on said support portion of said bracket for engagement therewith and a bearing means carried by said gib, and which is engageable with said downwardly facing way, said gib being adjustably positionable along said tapered surfaces of said support portion to adjustably position the bearing means transversely of the downwardly facing way surface and means for retaining said gib in any adjusted position.

4. In a machine tool; a support member having opposed upwardly and downwardly facing ways and first and second opposed ways extending parallel to said upwardly and downwardly facing ways and spaced vertically above said upwardly facing way; a movable member supported by said upwardly facing way for movement in opposite directions therealong, a first plurality of way engaging assemblies carried by said movable members for engaging said downwardly facing way, said first plurality of way engaging assemblies each including bearing means rollingly engaged with said downwardly facing way, and second and third pluralities of spaced way engaging assemblies carried by said movable member for respectively engaging said first and second ways for guiding the movement of said movable member relative to the support member, said second and third pluralities of way engaging assemblies each comprising a shaft supported by a support portion on said movable member, a roller rotatably supported on the shaft for rotation about its axis, and means operatively associated with said roller for adjustably positioning the latter toward and from the adjacent way.

5. In a machine tool, as defined in claim 4, and wherein said rollers of said second plurality of guide assemblies are rotatably supported on an eccentric surface on the shaft and the shaft is rotatably supported by said support portions on the movable member whereby rotation of the shaft effects linear movement of said roller toward and from the adjacent way, and locking means for locking said shaft against rotation in any adjusted position.

6. In a machine tool, as defined in claim 4, and wherein said upwardly facing way is V-shaped and supports the plurality of spaced cylindrical rollers thereon in a staggered relation with adjacent rollers having their axes extending transversely of one another and alternate ones having their axes extending parallel to one another, and wherein said movable member has a support portion provided with first and second side surfaces which intersect to form a V-shaped recess therein, said first and second side surfaces engaging alternate ones of said cylindrical rollers along their sides whereby movement of said movable member transversely of said V-shaped way is prevented.

7. In a machine tool, as defined in claim 4, and wherein each of said first way engaging assemblies comprises a support portion projecting underneath said downwardly facing way, said support portion having a tapered surface disposed beneath and which converges toward said downwardly facing way; a gib having a tapered surface complementary with said tapered surface on said support portion and in engagement therewith and carrying said bearing means, said gib being adjustably positionable along said tapered surface of said support means to adjustably position the bearing means transversely of the downwardly facing way surface, and means for retaining said gib in any adjusted position.

8. In a machine tool; a support member; a movable member supported by said support member for movement in opposite directions relative thereto; one of said members having first and second opposed, laterally spaced guide surfaces extending in the direction of movement of said movable member; first and second gibs slidably supported by the other of said members adjacent said first and second guide surfaces, respectively, said first and second gibs respectively carrying first and second pluralities of spaced guide assemblies for engaging said first and second guide surfaces at spaced locations therealong for guiding the movement of said movable member; each of said first and second guide assemblies including a roller in rolling contact with the adjacent guide surface, said gibs and the other of said members having complementary tapered surfaces converging toward said guide surfaces and with the tapered surface on said gibs being in sliding engagement with said tapered surfaces on the other of said members, means adjustably positioning said gibs along said tapered surfaces on the other of said members to simultaneously adjustably position the rollers of said guide assemblies carried by the gib toward and from the adjacent guide surface, and means for individually adjustably positioning said rollers of said guide assemblies independently of movement of said gibs.

9. In a machine tool; a support member having upwardly and downwardly facing ways, at least one of said upwardly facing ways being V-shaped; a plurality of spaced roller bearings carried by said upwardly facing ways and projecting there-above, said roller bearings supported by said V-shaped upwardly facing way being cylindrical rollers disposed in staggered relation with adjacent rollers having their axes extending transversely to one another and alternate ones having their axes extending parallel to one another; a movable member supported by said roller bearings in spaced relation relative to said upwardly facing ways for movement in opposite directions therealong, said movable member having a V-shaped portion for cooperatively engaging said cylindrical rollers, said movable member having at least one support portion projecting beneath one of said downwardly facing ways, said support portion having a tapered surface disposed beneath and converging toward said one downwardly facing way; a gib having a tapered surface complementary with said tapered surface of said support portion and in engagement therewith and bearing means carried by said gib engageable with said one downwardly facing way, said gib being adjustably positionable along said tapered surface of said support portion to adjustably position said bearing means transversely of the surface of said one downwardly facing way; and means for retaining said gib in any adjusted position.

10. In a machine tool as defined in claim 9, wherein said tapered surface of said support portion is linearly tapered in opposite longitudinal directions so as to diverge from said downwardly facing way proceeding from a location intermediate the ends of said tapered surface.

References Cited

UNITED STATES PATENTS

| | | | |
|---|---|---|---|
| 1,673,163 | 6/1928 | Schmelzkopf | 308—6 |
| 1,811,508 | 6/1931 | Klages | 308—3 |
| 1,910,534 | 5/1933 | Glasner. | |
| 2,291,665 | 8/1942 | Turrettini. | |
| 2,309,298 | 1/1943 | Bickel | 308—3 |
| 2,315,846 | 4/1943 | Fritzsch | 308—3 |
| 3,008,774 | 11/1961 | Morris et al. | 308—3 |
| 3,113,807 | 12/1963 | Polidor | 308—6 |

ANDREW R. JUHASZ, Primary Examiner

G. WEIDENFELD, Assistant Examiner

U.S. Cl. X.R.

90—15, 58